United States Patent
Mishra

(10) Patent No.: US 10,757,967 B2
(45) Date of Patent: Sep. 1, 2020

(54) APPLICATION OF A FLAVORANT PARTICLE IN A FILTER OF A SMOKING ARTICLE FOR DELIVERING FLAVOR

(71) Applicant: ALTRIA CLIENT SERVICES LLC, Richmond, VA (US)

(72) Inventor: Munmaya K. Mishra, Manakin Sabot, VA (US)

(73) Assignee: Altria Client Services LLC, Richmond, VA (US)

(*) Notice: Subject to any disclaimer, the term of this patent is extended or adjusted under 35 U.S.C. 154(b) by 545 days.

(21) Appl. No.: 15/439,121

(22) Filed: Feb. 22, 2017

(65) Prior Publication Data

US 2017/0295842 A1   Oct. 19, 2017

Related U.S. Application Data

(60) Provisional application No. 62/324,764, filed on Apr. 19, 2016.

(51) Int. Cl.
- *A24D 3/06* (2006.01)
- *A23L 27/00* (2016.01)
- *B02C 23/10* (2006.01)
- *A24B 15/28* (2006.01)
- *A24D 3/10* (2006.01)

(52) U.S. Cl.
CPC ............. *A24D 3/061* (2013.01); *A23L 27/72* (2016.08); *A24B 15/283* (2013.01); *A24D 3/10* (2013.01); *B02C 23/10* (2013.01)

(58) Field of Classification Search
CPC ................. A24D 3/061; A23L 27/72
USPC ......................................................... 131/275
See application file for complete search history.

(56) References Cited

U.S. PATENT DOCUMENTS

| 5,064,669 A | 11/1991 | Tan et al. |
| 5,284,659 A * | 2/1994 | Cherukuri ............... A23G 3/36 424/441 |
| 5,322,075 A | 6/1994 | Deevi et al. |
| 5,499,636 A | 3/1996 | Baggett, Jr. et al. |

(Continued)

FOREIGN PATENT DOCUMENTS

| EP | 2885983 A1 | 6/2015 | |
| WO | WO-2014072735 A1 * | 5/2014 | ............. A23L 27/12 |

(Continued)

OTHER PUBLICATIONS

Machine translation of WO 2017025342 (Year: 2017).*

(Continued)

*Primary Examiner* — Eric Yaary
*Assistant Examiner* — Russell E Sparks
(74) *Attorney, Agent, or Firm* — Harness, Dickey & Pierce, P.L.C.

(57) ABSTRACT

A method of manufacturing flavorant particles includes melting a food grade wax and a flavorant into a molten wax; solidifying the molten wax; and grinding the solidified molten wax into a plurality of flavorant particles. Another method of manufacturing flavorant particles includes melting a food grade wax and a flavorant into a molten wax, the molten wax having a melting temperature between about 50° C. to about 70° C.; and spray-chilling the molten wax into at least one solid flavorant particle, the solid flavorant particle having a diameter of between about 0.1 mm to about 2.0 mm.

15 Claims, 3 Drawing Sheets

(56) References Cited

U.S. PATENT DOCUMENTS

| | | |
|---|---|---|
| 5,591,368 A | 1/1997 | Fleischhauer et al. |
| 5,666,976 A | 9/1997 | Adams et al. |
| 5,692,525 A | 12/1997 | Counts et al. |
| 5,692,526 A | 12/1997 | Adams et al. |
| 5,915,387 A | 6/1999 | Baggett, Jr. et al. |
| 5,934,289 A | 8/1999 | Watkins et al. |
| 5,988,176 A | 11/1999 | Baggett, Jr. et al. |
| 6,026,820 A | 2/2000 | Baggett, Jr. et al. |
| 6,026,829 A | 2/2000 | Mitha |
| 6,053,176 A | 4/2000 | Adams et al. |
| 6,209,547 B1 | 4/2001 | Koller et al. |
| 6,595,218 B1 | 7/2003 | Koller et al. |
| 7,878,962 B2 | 2/2011 | Karles et al. |
| 8,820,331 B2 | 9/2014 | Hartmann et al. |
| 8,978,661 B2 * | 3/2015 | Atchley ............ A24B 13/00 131/111 |
| 2006/0174901 A1 | 8/2006 | Karles et al. |
| 2007/0051383 A1 | 3/2007 | Woods |
| 2007/0148285 A1 | 6/2007 | Yang |
| 2008/0029110 A1 | 2/2008 | Dube et al. |
| 2008/0230079 A1 | 9/2008 | Besso et al. |
| 2011/0083680 A1 * | 4/2011 | Mishra ............ A24B 15/283 131/275 |
| 2011/0271968 A1 | 11/2011 | Carpenter et al. |
| 2012/0017926 A1 | 1/2012 | Karles et al. |
| 2012/0024305 A1 | 2/2012 | Liu et al. |
| 2013/0340774 A1 | 12/2013 | Mishra et al. |
| 2014/0026900 A1 | 1/2014 | Karles et al. |
| 2014/0137878 A1 | 5/2014 | Karles et al. |
| 2014/0209111 A1 | 7/2014 | Russell et al. |

FOREIGN PATENT DOCUMENTS

| | | | |
|---|---|---|---|
| WO | WO-2015091792 A1 | 6/2015 | |
| WO | WO-2015092748 A1 * | 6/2015 | ........... A24B 15/283 |
| WO | WO-2017025342 A1 * | 2/2017 | ........... A61K 9/1617 |

OTHER PUBLICATIONS

Castor Wax Flakes-White, Texas Natural Supply, https://web.archive.org/web/20130716180128/https://www.texasnaturalsupply.com/Castor-Wax-Flakes-White-p/cwfw-wx.htm (Year: 2013).*

International Search Report and Written Opinion dated May 10, 2017 in corresponding International Patent No. PCT/US2017/018891, 9 pages.

Supplementary European Search Report dated Oct. 22, 2019 for corresponding European application No. 17786284.4.

* cited by examiner

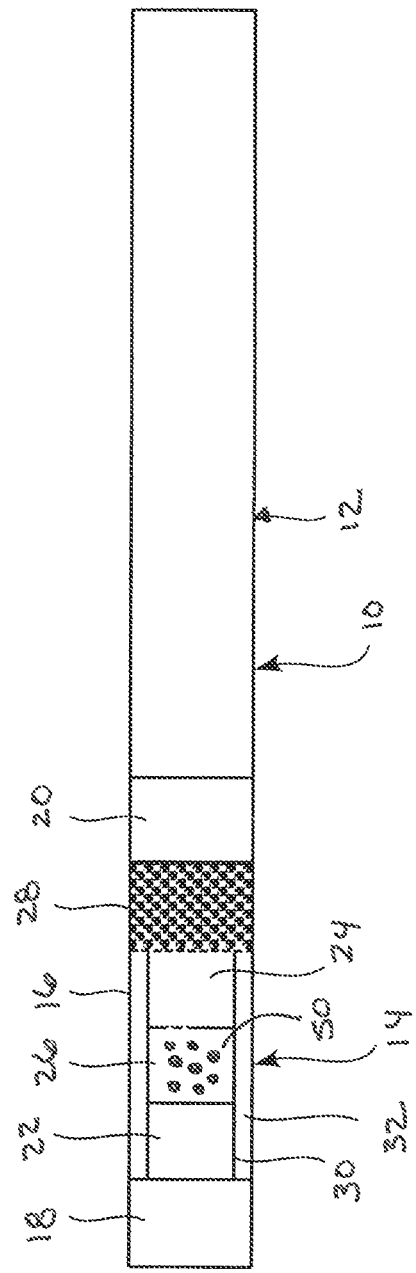
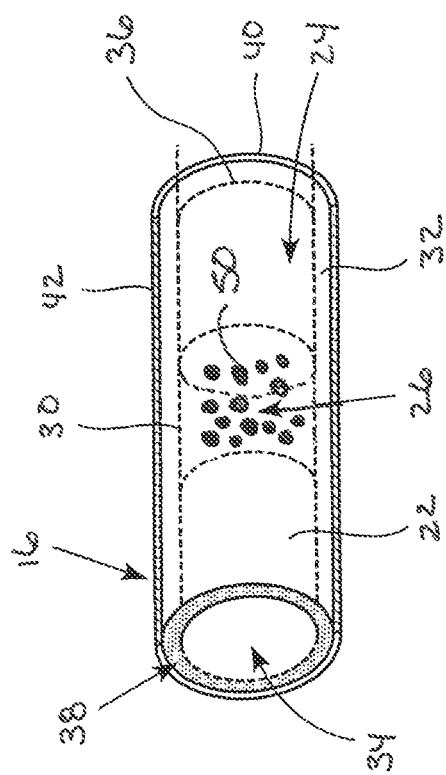
FIG. 1
FIG. 2

APPLICATION OF A FLAVORANT PARTICLE IN A FILTER OF A SMOKING ARTICLE FOR DELIVERING FLAVOR

CROSS REFERENCE TO RELATED APPLICATIONS

The present application claims priority under 35 U.S.C. 119 to U.S. Provisional Patent Application No. 62/324,764 filed on Apr. 19, 2016 the entire content of which is hereby incorporated by reference.

FIELD OF THE INVENTION

The present disclosure generally relates to smoking articles, such as cigarettes and filters for use with cigarettes as well as to methods of manufacturing cigarettes and filters.

SUMMARY

A method is disclosed of manufacturing flavorant particles, the method comprising: melting a food grade wax and a flavorant into a molten wax; solidifying the molten wax; and grinding the solidified molten wax into flavorant particles.

A method is disclosed of manufacturing a flavorant particle, the method comprising: melting a food grade wax and a flavorant into a molten wax, the molten wax having a melting temperature between about 50° C. to about 70° C.; and spray-chilling the molten wax into a solid flavorant particle, the solid flavorant particle having a diameter of between about 0.1 mm to about 2.0 mm.

A method is disclosed of forming a filter of a smoking article such as a cigarette comprising: inserting at least one of the ground flavorant particles into a hollow axial space between adjacent absorbent members, the at least one flavorant particle containing a fluid/vapor/solid material for modifying characteristics of tobacco smoke during smoking of the smoking article; and wrapping the at least one flavorant particle and the adjacent absorbent members with an outer cover.

A method is disclosed of forming a cigarette, which includes forming a cigarette filter having at least one of the flavorant particles and attaching a cigarette rod to one end of the cigarette filter.

BRIEF DESCRIPTION OF THE DRAWING FIGURES

FIG. 1 is a plan view of a smoking article in the form of a cigarette according to an embodiment.

FIG. 2 is a perspective view of a portion of a filter for a smoking article according to an embodiment.

DETAILED DESCRIPTION

Figure 5:
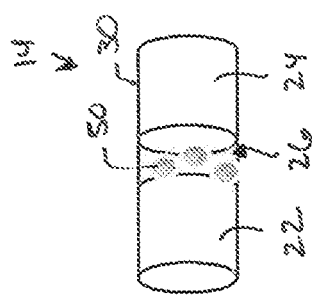
FIG. 5 is a perspective view of a filter for a smoking article according to an embodiment.

A method of making a filter for a smoking article having a releasable matrix of flavorant particles having at least one additive material, such as a flavor component, in a tobacco product, such as a cigarette, is described hereafter. Improved delivery through controlled release of the at least one additive material to smoking articles may be achieved through the use of one or more flavorant particles, which are preferably solidified molten chunks or frangible flavored particles, containing the at least one additive material. In accordance with an exemplary embodiment, the flavorant particle(s) or frangible flavored particles are inserted axially into an opening formed between, for example, a pair of cellulose acetate plugs, and/or within a plug of cellulose acetate. The flavorant particle, when exposed to mainstream smoke and/or released on demand by mechanical interaction by a smoker, releases the additive material.

As shown in FIG. 1, a smoking article 10, for example, a cigarette, contains two sections, a tobacco-containing portion sometimes referred to as the tobacco or cigarette rod 12, and a filter portion or filter 14. Tipping paper typically surrounds the filter 14, which forms the mouth end of the cigarette. The tipping paper overlaps with the tobacco rod in order to hold the filter and tobacco rod together. The tobacco rod 12, or tobacco containing element of the cigarette, includes the paper wrapper in which the tobacco is wrapped and the adhesive holding the seams of the paper wrapper together. The tobacco rod 12 has a first end, which is integrally attached to the filter, and a second end, which is lit or heated for smoking the tobacco. When the tobacco rod 12 is lit or heated for smoking, the smoke travels from the lit end downstream to the filter end of the tobacco rod and further downstream through the filter.

The filter 14 can be used with traditional cigarettes and non-traditional cigarettes. Non-traditional cigarettes include, for example, cigarettes for electrical smoking systems as described in commonly-assigned U.S. Pat. Nos. 6,026,820; 5,988,176; 5,915,387; 5,692,526; 5,692,525; 5,666,976; and 5,499,636, the disclosures of which are incorporated by reference herein in their entireties.

In accordance with an exemplary embodiment, a flavored medium, for example, a flavor bead or matrix of beads and/or flavored chunks 50 can be placed in a single plug-space-plug configuration (FIGS. 2 and 5) or in a multiple plug-space-plug configuration within the filter (FIG. 1) or evenly distributed in a filter (FIG. 4) of a smoking article 10 that releases flavor by being crushed, rubbed, or by mechanical means. The flavor beads and/or flavored chunks 50 may be designed in a way that mechanical interaction with the medium releases the flavor. In accordance with an exemplary embodiment, based on the interaction with the flavor beads and/or the flavored chunks 50, the consumer can choose not to add additional flavor by not interacting with the medium, or alternatively, additional flavor can be added based on the amount of interaction with the medium.

In accordance with an exemplary embodiment, the flavor beads (with or without tobacco or tobacco flavor/extract) or flavor chunks 50 can be fabricated by using techniques such as spheronization, spray-chilling, and/or extrusion processes. In accordance with an exemplary embodiment, the flavor release profile of the flavor beads or chunks 50 can be modified by using a fluidized bed coating and/or a pan coating to produce, for example, beads with a core-shell structure or matrix structure with or without layering. In accordance with an exemplary embodiment, depending on the method of manufacturing of the flavored beads and/or flavor chunks 50, the beads and/or chunks 50 produced can exhibit various flavor delivery profiles.

In accordance with an exemplary embodiment, each bead 50 can have a core (matrix) and may include one or more layers surrounding the core. The layers can include a coating/binder and may include additional flavor, tobacco/tobacco flavor, and any other additive or combination thereof. For example, the matrix and/or core may include a carbohydrate, a water soluble or insoluble polymer, a flavorant, or a combination thereof. In accordance with an exemplary embodiment, the core of the flavored bead 50 preferably has a diameter of about 0.5 mm to 2.0 mm. In accordance with an exemplary embodiment, the flavored beads 50 preferably have a generally round outer diameter.

In accordance with an exemplary embodiment, the flavorant particles or chunks 50 can be prepared by solidifying molten food grade wax containing flavor(s) using a spray-chilling process. In accordance with another exemplary embodiment, the method can include melting a food grade wax and a flavorant into a molten wax, solidifying the molten wax, and grinding the solidified molten wax into a plurality of flavorant particles. In accordance with an exemplary embodiment, for example, the molten wax can be sprayed chilled into a chamber of cold air, which hardens or chills the molten wax into solid particles.

In accordance with an exemplary embodiment, for spray-chilled particles, the particles, preferably have a uniform diameter of between about 0.2 mm to about 1.0 mm. In accordance with an exemplary embodiment, the size of the flavorant particles 50 can be controlled by one or more of the following: flow rate of molten wax, nozzle size, pressure, and/or a combination thereof. In accordance with an exemplary embodiment, for example, two or more sizes of spray-chilled particles 50 can be combined in, for example, a tobacco filter, or a moist smokeless tobacco product.

In accordance with an exemplary embodiment, the molten wax can be injected or sprayed into an air chamber having a temperature of about 0° C. to about 15° C. For example, for use in a cigarette filter, the molten wax preferably has a melting temperature of about 50° C. to about 100° C., and more preferably, a melting temperature of about 50° C. to about 70° C.

In accordance with an exemplary embodiment, the melting temperature of the wax is preferably greater than about 50° C. such that during transportation and/or storage of, for example, tobacco products, the wax does not melt from ambient or surrounding temperatures, and is less than about, for example, 70° C., such that, for example, heat from a filter end of tobacco rod can melt the flavorant particles to release the flavorant.

In accordance with an exemplary embodiment, for use with moist smokeless tobacco products, the melting temperature of the molten wax can be between, for example, 50° C. to about 50° C., and more preferably, a melting temperature of about 50° C. to about 60° C. such that the flavorant particles 50 can release the flavorant by mechanical interaction rather than exposure to heat.

In accordance with an exemplary embodiment, for the method, which includes melting a food grade wax and a flavorant into a molten wax, solidifying the molten wax, and grinding the solidified molten wax into a plurality of flavorant particles, each of the plurality of flavorant particles or chunks after grinding of the solidified molten wax can have a diameter (or size) ranging from about 0.1 mm to about 2.0 mm, and more particularly a diameter (or size) ranging from about 0.2 mm to about 2.0 mm. In accordance with an exemplary embodiment, the plurality of flavorant particles or chunks 50 preferably has an irregular shape, for example, not round.

In accordance with an exemplary embodiment, the ground flavorant particles can be placed through a sieve such that the flavorant particles have a size ranging from about 0.1 mm to 2.0 mm, and more particularly placing the flavorant particles through a sieve such that the flavorant particles have a size ranging from about 0.2 mm to 2.0 mm. For example, a sieve such as a No. 170 (US) or a 170 Mesh (Tyler) having a 0.088 mm opening to a No. 10 (US) or a 9 Mesh (Tyler) having a 2.0 mm opening could be used.

In accordance with an exemplary embodiment, the wax can be, for example, beeswax. In addition, waxes such as shellac, paraffin, carnauba, candelilla, and/or polyethylene waxes can be used. In accordance with an exemplary embodiment, two or more different waxes can be combined. For example, in accordance with an exemplary embodiment, the two or more waxes can be combined to have a melting temperature of between, for example, about 50° C. to about 70° C. In accordance with an exemplary embodiment, the wax can COMPRITOL® 888 glyceryl behenate.

An exemplary embodiment of a method of making smoking articles, such as cigarettes includes providing a cut filler to a cigarette-making machine to form a tobacco portion (for example, a tobacco column), placing a paper wrapper around the tobacco column to form a tobacco rod 12, and attaching a filter 14 to the tobacco rod to form the cigarette 10. As shown in FIG. 1, the filter 14 can include one or more flavorant particles or flavor chunks 50, and more preferably a plurality of flavorant particles or flavor chunks 50. Advantageously, for example, a plurality of flavorant particles or flavor chunks 50 can provide more surface area, for example, than a single bead.

The term "mainstream smoke" includes the mixture of gases and/or aerosols passing down a cigarette 10, such as a tobacco rod 12, and issuing from an end, such as through the filter end, for example, the amount of smoke issuing or drawn from the mouth end of a cigarette during smoking of the cigarette 10. The mainstream smoke contains air that is drawn in through the heated region of the cigarette 10 and through the paper wrapper.

As shown in FIG. 1, the filter 14 can include a filter subassembly 16 having a first absorbent member 22 and a second absorbent member 24 with a cavity 26 provided between the first and second absorbent members 22, 24. In accordance with an exemplary embodiment, a third absorbent member 28, for example, in the form of a quantity of activated carbon can be provided on a first side of the filter subassembly 16 and a fourth absorbent member 20 can be provided on a second side of the filter subassembly 16. The fourth absorbent member 20 may also contain a quantity of activated carbon wherein the sorbent articles are distributed in the filamentary tow. In exemplary embodiments, absorbent members 22, 24, 28, 20 can be filter plugs including cellulose acetate plugs.

"Smoking" of a cigarette 10 is intended to mean the heating, combusting or otherwise causing a release of certain chemicals from tobacco. Generally, smoking of a cigarette involves lighting one end of the cigarette and drawing the smoke downstream through the mouth end of the cigarette, while the tobacco contained therein undergoes combustion, pyrolysis, or distillation of volatiles. However, the cigarette may also be smoked by other ways. For example, the cigarette may be smoked by heating the cigarette using an electrical heater, as described, for example, in commonly-assigned U.S. Pat. Nos. 6,053,176; 5,934,289; 5,591,368 or 5,322,075, each of which is incorporated herein by reference in its entirety.

Examples of suitable types of tobacco materials that may be used include, but are not limited to, flue-cured tobacco, Burley tobacco, Maryland tobacco, Oriental tobacco, rare tobacco, specialty tobacco, blends thereof, and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. Tobacco substitutes may also be used.

In traditional cigarette manufacture, the tobacco is normally used in the form of cut filler, i.e., in the form of shreds or strands cut into widths ranging from about 1/10 inch to about 1/20 inch or even about 1/40 inch. The lengths of the strands range from between about 0.25 inch to about 3.0 inches. The cigarettes may further comprise one or more flavors, or other suitable additives (e.g., burn additives, combustion modifying agents, coloring agents, binders, etc.).

The filter material of the filter 14 may be any of the variety of fibrous materials suitable for use in tobacco smoke filter elements. Typical fibrous materials include cellulose acetate, polypropylene, or paper. Preferably, the absorbent materials (or filter material) 20, 22, 24, 26 will be cellulose acetate.

Various cigarette filter constructions may be used, in which one or more flavorant particles may be incorporated. Exemplary filter structures that may be used include, but are not limited to, a mono filter, a dual filter, a triple filter, a single or multi cavity filter, a recessed filter, a free-flow filter, combinations thereof, and the like. Mono filters typically contain cellulose acetate tow or cellulose paper materials. Pure mono cellulose filters or paper filters offer good tar and nicotine retention, and are highly degradable. Dual filters typically comprise a cellulose acetate mouth end and a pure cellulose or cellulose acetate segment. The length and pressure drop of the segments in a dual filter may be adjusted to provide optimal sorption, while maintaining acceptable draw resistance. Triple filters may include mouth side and smoking material or tobacco side segments, and a middle segment comprising paper. Cavity filters include at least two segments, for example, acetate-acetate, acetate-paper, or paper-paper, separated by at least one cavity. Recessed filters include an open cavity on the mouth side. The filters may also be ventilated and/or comprise additional sorbents, catalysts or other additives suitable for use in the cigarette filter.

In accordance with an exemplary embodiment, the filter 14 of an exemplary embodiment of a cigarette 10 may be constructed with an upstream sorbent and a downstream flavorant particle. A sorbent, for example, activated carbon, can be located in a cavity at a distance from one or more flavorant particles, which can be located in a second section or portion of a filter spaced from the sorbent. Such arrangement would allow for the filtration of the cigarette to be accomplished by the sorbent, and for the flavor to be disposed within the cigarette without the effectiveness of the flavor being affected by absorption or adsorption by the sorbent.

As used herein, the term "sorption" denotes filtration by adsorption and/or absorption. Sorption is intended to encompass interactions on the outer surface of the sorbent, as well as interactions within the pores and channels of the sorbent. In other words, a "sorbent" is a substance that may condense or hold molecules of other substances on its surface, and/or take up other substances, for example, through penetration of the other substances into its inner structure, or into its pores. As used herein, the term "sorbent" refers to an adsorbent, an absorbent, or a substance that may perform both of these functions. As used herein, the term "remove" refers to adsorption and/or absorption of at least some portion of a constituent of mainstream tobacco smoke.

While any suitable material may be used as a sorbent, preferred embodiments can include activated carbon sorbents or microporous materials. The sorbent may be any material, which has the ability to absorb and/or adsorb gas constituents on the surface thereof or to assimilate such constituents into the body thereof. If desired, the sorbent can incorporate catalyst material therein. By way of example, sorbent materials may include, but are not limited to, carbons such as activated carbon, aluminas, silicates, molecular sieves, and zeolites and may be used alone or in combination. In a preferred embodiment, the sorbent material is activated carbon.

Microporous materials (for example, microporous sorbents) such as, for example, an activated carbon can be used to filter out gas constituents from cigarette smoke. The microporous sorbent may have pores with widths or diameters of less than about 20 Å. While microporous materials can be useful for filtering cigarette smoke, microporous materials may also hinder a cigarette designer's ability to add volatile flavor components like menthol, for example. In particular, microporous sorbents tend to adsorb and/or absorb the flavor components during the time between cigarette manufacture and use by the consumer, thus reducing the effectiveness of the flavor components in the cigarette.

In addition to the reduction of the effectiveness of the flavor components due to the adsorption/absorption by the microporous sorbents, two additional problems are also encountered when the flavor component migrates to and is adsorbed/absorbed by the sorbent. In accordance with an exemplary embodiment, the flavor component may occupy active sites in the sorbent; thereby reducing the sorbent's ability to remove targeted gas phase constituents from smoke. In addition, because the flavor component is often strongly adsorbed/absorbed by the sorbent, the flavor component may not be sufficiently releasable. As such, separation between the microporous materials and the flavor components, or other additives is desired.

The term "additive material" means any material or component, which modifies the characteristics of a cigarette when the cigarette is smoked. Any appropriate additive material or combination of materials may be contained inside the one or more flavorant particles to modify the characteristics of the cigarette 10. Such additive materials can include flavors, neutralizing agents, and other smoke modifiers, such as chemical reagents like 3-aminopropylsilyl (APS). Additionally, the additive materials may also include diluents, solvents or processing aids that may or may not impact the sensorial attributes of the mainstream smoke but aid in processing of an additive and its encapsulation and presentation in a cigarette.

In an exemplary embodiment, the additive materials may include one or more flavors, such as liquid or solid flavors and flavor formulations or flavor-containing materials. The term "flavor" or "tobacco flavor" may include any flavor compound or tobacco extract suitable for being releasably disposed in liquid form within one or more flavorant particles to enhance the taste of mainstream smoke produced, for example, by a cigarette.

Suitable flavors or flavorings can include, but are not limited to, menthol, mint, such as peppermint and spearmint, chocolate, licorice, citrus and other fruit flavors, gamma octalactone, vanillin, ethyl vanillin, breath freshener flavors, spice flavors such as cinnamon, methyl salicylate, linalool, bergamot oil, geranium oil, lemon oil, ginger oil, and tobacco flavor. Other suitable flavors may include flavor compounds selected from the group consisting of an acid, an alcohol, an ester, an aldehyde, a ketone, a pyrazine, combinations or blends thereof and the like.

In accordance with an exemplary embodiment, for example, the flavorant particles 50 can include about 1% to about 10% flavor or flavoring by weight, and 99% to 90% wax by weight, and more preferably about 2% to about 5% flavor or flavoring by weight, and 98% to 95% wax by weight. For example, in accordance with an exemplary embodiment, the molten wax includes 5% flavor and 95% wax by weight, for example, In one embodiment, the additive material may serve as a chemical reagent for one or more components of mainstream smoke. Such an additive material may include, by way of example, a chemical additive, which interacts with the one or more components in mainstream smoke. For example, see commonly assigned U.S. Pat. Nos. 6,209,547 and 6,595,218, which discuss reagents, both of which are expressly incorporated herein by reference in their entireties.

The flavorant particles in the filter arrangement provide advantages particularly for cigarettes containing activated carbon. By placing the flavorant particles in the filter downstream from activated carbon in cigarettes containing activated carbon in the filter, adsorption of released additive material by the activated carbon and consequent deactivation of the carbon is substantially prevented. Thus, where the additive material is a flavor component, flavor adsorption by the activated carbon during storage of cigarettes and during smoking is substantially prevented.

By incorporating the additive material such as solid, vapor, or liquid in one or more flavorant particles in a filter, loss of flavor to side stream smoke is substantially reduced and less or none of the flavor component is pyrolyzed during the smoking of the cigarette. In addition, by positioning the one or more flavorant particles containing the additive material in the filter section, the activated carbon can maintain its ability to modify cigarette smoke, which includes removing volatile organic components, such as 1,3-butadiene, acrolein and isoprene from mainstream smoke.

The term "releasably disposed" as used herein refers to the containment and release of additive materials in flavorant particles such that the additive materials are sufficiently contained to substantially avoid or minimize unwanted migration, such as, for example, during storage. This term also includes, but is not limited to, the additive materials in the flavorant particle being mobile enough to be released from the flavorant particle when, for example, the flavorant particle is broken or opened by mechanical force. For example, the flavorant particle may be released on demand by mechanical interaction by squeezing a portion of a cigarette filter containing the flavorant particle, thus releasing the additive material from within the flavorant particle.

FIG. 2 is a perspective view of a portion of a cigarette filter 14 according to an embodiment. As shown in FIG. 2, the filter 14 includes a first absorbent material 22, a second absorbent material 24, and a cavity 26 between the first and second absorbent materials 22, 24. The first absorbent member 22 is generally cylindrical in shape and defines a first end surface 34. The first end surface 34 of the first absorbent member 22 forms a first end 38 for the cigarette filter 14. The second absorbent member 24 is also generally cylindrical in shape and defines a second end surface 36. The second end surface 36 of the second absorbent member 24 forms a second end 40 of the cigarette filter 14. The first and second absorbent members 22, 24 are enclosed about their outer surface by a cover 30 in the form of a suitable conventional plug wrap.

In accordance with an exemplary embodiment, the flavorant particles or chunks 50 can be provided between the first absorbent member 22 and the second absorbent member 24. In accordance with an exemplary embodiment, the flavorant particles or chunks 50 preferably contain a releasable additive, which can be a solid or fluid material, such as a liquid or vapor, for modifying characteristics of tobacco smoke during smoking of the cigarette 10. The flavorant particles or chunks 50 release at least a portion of the additive material when the flavorant particles or chunks 50 are subjected to a mechanical force, such as by squeezing by the smoker. In accordance with an exemplary embodiment, the flavorant particles or chunks 50 preferably have an irregular shape.

In accordance with an exemplary embodiment, the first and second absorbent members 22, 24 are comprised of cellulose acetate. In a preferred embodiment, the flavorant particles or chunks 50 comprise a plurality of flavorant particles or chunks 50 provided between the first and second absorbent members 22, 24.

In accordance with an exemplary embodiment, the flavorant particles or chunks 50 may be formed in a variety of physical formations including singular part or multipart flavorant particles or chunks 50. The flavorant particles 50 may be present in the filter section of a cigarette in a dispersed arrangement if small flavorant particles are provided, or may be present in one or more cavities 26, 27 within the filter 14.

When the additive material of the flavorant particles or chunks 50 of the cigarette 10 is released on demand by mechanical interaction, the additive material is released from the flavorant particle. Mainstream smoke can flow from the tobacco rod 12 through the second absorbent member 24 and then through the first absorbent member 22. Dilution air may flow through the steam-set cellulose acetate annular layer or over wrap. The two flows can be adjusted by adjusting the cellulose acetate filtration efficiency, through the use of dilution holes, etc. The flavorant particle can be suitable for use with cigarettes that include an activated carbon in the filter 14. The flavorant particles or chunks 50 may contain flavor components and may also contain components that facilitate selective filtration of the mainstream smoke and which are also released prior to smoking of the cigarette 10.

The first and second absorbent members 22, 24 can be adjusted in size, density and composition to achieve different levels of dilution, resistance to flow and delivery.

In order to release the contained additive material from the flavorant particles or chunks 50, an external force, such as a mechanical action, can be applied. One preferable method of applying the external force would be to have a user squeeze or exert an external force on a filter containing the flavorant particle prior to or during the smoking of the cigarette. The squeezing action or application of external force preferably would break the flavorant particle 50 or at least partially deform a primary reservoir, which in turn would cause a displacement of mechanically locked or sealed in place internal components of the flavorant particle. This displacement would then create one or more open spaces between internal components through which at least a portion of the additive material may be released from the flavorant particle 50, for example, liquid and/or vapor can be released from the flavorant particle 50 to modify the tobacco smoke passing through the filter. The acting force can be in a direction along or across the cigarette axis. Torsion may also be applied. An external device, such as a pinching device, a tube squeezing device, tweezers or any other device for applying torsion or compression forces, may also be used to concentrate the force at a prescribed filter location repeatedly.

In accordance with an exemplary embodiment, the flavorant particles 50 as disclosed herein can be combined with an orally-enjoyed plant material, for example, a moist smokeless tobacco, such as snuff and/or snus. For example, some users of moist smokeless tobacco products such as snuff and/or snus products may notice certain negative flavor characteristics associated with bitterness, astringency, acridness, flavor harshness, and/or aftertaste. Thus, flavorant particles or chunks 50 as disclosed herein can be placed in a moist smokeless tobacco or snus product and by mechanical interaction, the flavorants can be released.

A preferred smoking article 10, in the form of a cigarette would include a tobacco rod 12 integrally attached to a filter 14, where the filter 14 would include at least one flavorant particles or chunks 50 containing an additive material for modifying the characteristics of the cigarette smoke.

Preferably, the filter 14 is arranged with the one or more flavorant particles 50 placed downstream from, for example, a sorbent material with a filter material, for example, a plug of cellulose acetate 22, 24 between the one or more flavorant particles 50 and the sorbent material or at the mouth end of the filter with one or more flavorant particles 50 placed between the mouth end of the filter or between the filter and the mouth end of the filter.

The flavorant particles or chunks 50 may be of any size suitable for use in a smoking article, such as a cigarette, or for a moist smokeless tobacco product, for example, 0.1 mm to 0.5 mm, 0.1 mm to 1.0 mm, 0.1 mm to 2.0 mm, and 0.1 mm to more than 2.0 mm. For traditional cigarettes, each of the plurality of flavorant particles 50 preferably has a diameter, for example, of about 0.1 mm to 2.0 mm, and more preferably, for example, about 0.2 mm to 2.0 mm.

In accordance with an exemplary embodiment, the flavorant particles or chunks 50 may contain flavor cores, which may be hydrophobic such as mint oil, menthol or other additives as mentioned above.

Figure 3:
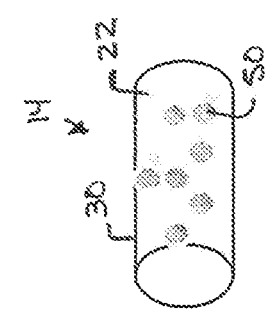
FIG. 3 is a perspective view of a filter having a matrix of flavorant particles for a smoking article according to an embodiment.

FIG. 3 is a perspective view of a filter 14 having a matrix of flavorant particles 50 for a smoking article 10 according to an embodiment. As shown in FIG. 3, the filter includes a first absorbent material 22 having a plurality of flavorant particles or chunks 50 embedded in the first absorbent material 22.

Figure 4:
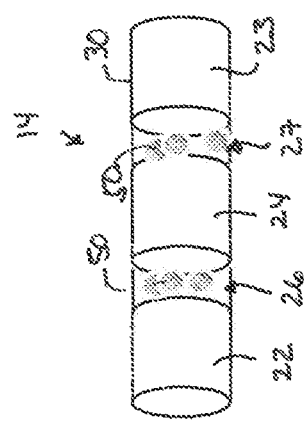
FIG. 4 is a perspective view of a filter for a smoking article according to an embodiment.

FIG. 4 is a perspective view of a filter 14 for a smoking article 10 according to an embodiment. As shown in FIG. 4, the filter 14 includes a first absorbent material 22, a second absorbent material 24, a third absorbent material 23, and a cavity (first cavity) 26 between the first and second absorbent materials 22, 24, and second cavity 27 between the second and third absorbent materials 24, 23. The third absorbent member 23 is between the first cavity 26 and the second cavity 27. The first, second, and third absorbent members 22, 24, 23, and the first and second cavities 26, 27 can be enclosed about their outer surface by a cover 30 in the form of a suitable conventional plug wrap.

In accordance with an exemplary embodiment, the first and second cavities 26, 27, can be at least partially filled with one or more flavorant particles 50. The flavorant particles or chunks 50 in the first and second cavities 26, 27 can be the same and/or a different flavorant, can be the same or a different size of flavorant particles, and/or can be a combination thereof.

In accordance with an exemplary embodiment, each of the flavorant particles (or chunks) 50 contains a releasable additive, which can be a solid or fluid material, such as a liquid or vapor, for modifying characteristics of tobacco smoke during smoking of the cigarette 10. The flavorant particles or chunks 50 release at least a portion of the additive material when the flavorant particles or chunks 50 are subjected to a mechanical force, such as by squeezing by the smoker.

FIG. 5 is a perspective view of a filter 14 for a smoking article 10 according to an exemplary embodiment. As shown in FIG. 5, the filter 14 includes a first absorbent material 22, a second absorbent material 24, and a cavity 26 between the first and second absorbent materials 22, 24. In accordance with an exemplary embodiment, the cavity 26 is filled with a plurality of flavorant particles (or chunks) 50.

Figure 6:
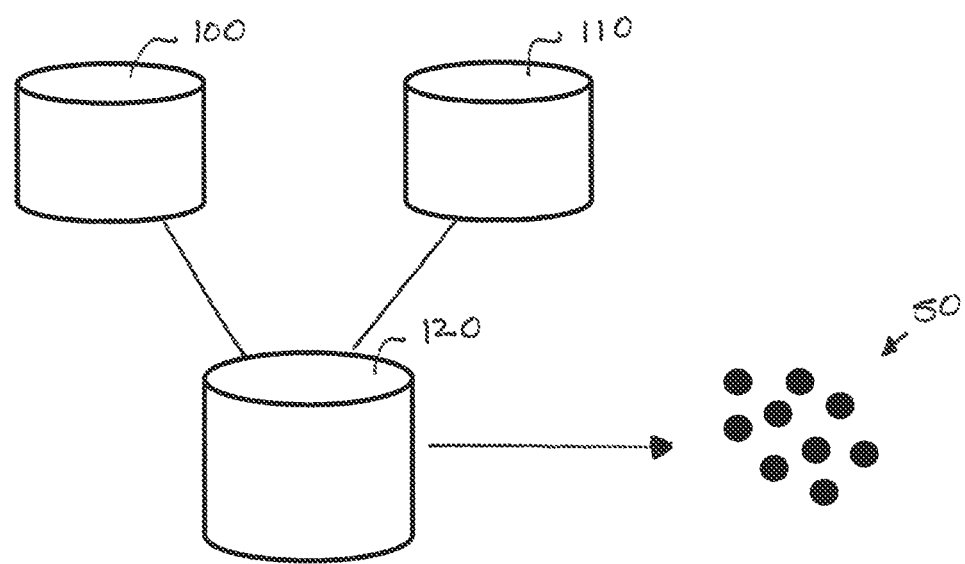
FIG. 6 is an illustration of a method of manufacturing flavorant particles in accordance with an exemplary embodiment.

FIG. 6 is an illustration of a method of manufacturing flavorant particles in accordance with an exemplary embodiment. As shown in FIG. 6, the melt includes melting a food grade wax 100 and a flavorant 110 into a molten wax 120. The molten wax 120 is then solidified and ground into flavorant particles 50. Alternatively, in accordance with an exemplary embodiment, the molten wax 120 can be spray-chilled into solid flavorant particles 50.

While this disclosure has been described in detail with reference to specific embodiments, it will be apparent to one skilled in the art that various changes and modification may be made, and equivalents thereof employed, without departing from the scope of the appended claims.

What is claimed is:

1. A method of manufacturing flavorant particles, the method comprising:
   melting a food-grade wax and a flavorant into a molten wax, the food-grade wax having a melting temperature ranging from 50° C. to 70° C.;
   solidifying the molten wax; and
   grinding the solidified molten wax into flavorant particles, each of the flavorant particles including about 1% to about 5% of the flavorant by weight and about 95% to about 99% of the food-grade wax by weight.

2. The method according to claim 1, wherein the molten wax has a melting temperature of about 50° C. to about 60° C.

3. The method according to claim 1, wherein the food-grade wax includes beeswax, paraffin, carnauba, candelilla, polyethylene waxes, or any combination thereof.

4. The method according to claim 1, wherein the flavorant includes menthol, mint, such as peppermint and spearmint, chocolate, licorice, citrus and other fruit flavors, gamma octalactone, vanillin, ethyl vanillin, breath freshener flavors, spice flavors such as cinnamon, methyl salicylate, linalool, bergamot oil, geranium oil, lemon oil, ginger oil, tobacco flavor, or any combination thereof.

5. The method according to claim 1, further comprising;
   passing the flavorant particles through a sieve, and
   collecting the flavorant particles having a size ranging from 0.1 mm to 2.0 mm.

6. The method according to claim 5, wherein the size ranges from 0.2 mm to 2.0 mm.

7. A method of forming a filter of a cigarette comprising:
   inserting at least one of the flavorant particles formed by the method according to claim 1 into a hollow axial space between adjacent absorbent members, the at least one flavorant particle containing a material for modifying characteristics of tobacco smoke during smoking of the cigarette, the material including a fluid, a vapor, a solid, or any combination thereof; and
   wrapping the at least one flavorant particle and the adjacent absorbent members with an outer cover.

8. The method according to claim 7, wherein the adjacent absorbent members are cylindrical.

9. The method according to claim 7, wherein the absorbent members comprise cellulose acetate.

10. A method of forming a cigarette comprising;
forming the cigarette filter according to claim 7, and
attaching a cigarette rod to one end of the cigarette filter.

11. The method according to claim 1, further comprising:
combining the flavorant particles with a moist smokeless tobacco product.

12. The method of claim 1, wherein the food-grade wax is a combined wax including two or more different waxes.

13. The method of claim 1, wherein the flavorant particles are configured to release the flavorant on demand when subjected to a mechanical force.

14. The method of claim 13, wherein the mechanical force is a squeezing force.

15. The method of claim 1, wherein the flavorant particles have an irregular, non-spherical shape.

* * * * *